United States Patent Office 3,255,124
Patented June 7, 1966

---

3,255,124
BORON-CONTAINING POLYMERS AND METHOD OF PREPARATION
George H. Dorion, New Canaan, Conn., and Edward H. Sheers, Kew Gardens Hills, N.Y., assignors to American Cyanamid Company, New York, N.Y., a corporation of Maine
No Drawing. Filed Nov. 2, 1959, Ser. No. 850,104
10 Claims. (Cl. 260—2)

This invention relates broadly to boron-containing polymers and to a method of making the same. More particularly it is concerned with solid polymers comprised of a preponderant proportion by weight of carbon and hydrogen, and having also chemically combined in the polymer molecule from, by weight, about 1% to about 20% of boron. Examples of such polymers are solid polyalkylenes, specifically solid polymethylenes, having chemically combined in the polymer molecule from, by weight, about 1 or 2% to about 16 or 17% of boron.

It was known prior to the present invention that boron-containing polymers could be prepared. For example, U.S. Patent No. 2,517,945—Upson discloses polymeric reaction products of a hydrocarbosilanediol and a boronic acid selected from the class consisting of hydrocarbon and chlorohydrocarbon boronic acids, which polymeric reaction products have the recurring structural units

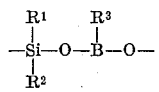

where $R^1$ and $R^2$ are monovalent hydrocarbon radicals and $R^3$ is a monovalent hydrocarbon or chlorohydrocarbon radical. U.S. Patent No. 2,434,953—Patnode discloses a borate of a lower-alkylpolysiloxane, and more particularly the Si-containing material or complex obtained by effecting reaction between boric acid and lower-alkylhalogenopolysiloxane substance containing an average of from 0.16 to 1.0 halogen atom per silicon atom. Henglein et al. (Die Macromolekulare Chemie, April 1955, pp. 177–87) and Nijimoto [Chem. Abstracts, vol. 47 (1953), p. 6179] disclose various polymers containing

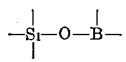

linkages.

To the best of our knowledge and belief, it was not known or suggested prior to our invention that there could be prepared boron-containing polymers having a combination of new, useful and unobvious properties and which are comprised essentially, preferably composed or consisting essentially, of a preponderant or major proportion (more than 50%, e.g., 60 to 80%) by weight of carbon and hydrogen, and having also chemically combined in the polymer molecule from, by weight, not less than 1% to not more than about 20% of boron. More particularly, the prior art nowhere shows or suggests especially useful polymers of the invention, namely, solid polymethylenes having an average of not more than 0.9 methyl groups per 100 methylene groups and which have chemically combined in the polymer molecule from, by weight, about 1% to about 20% by weight of boron.

The present invention is based on our discovery that solid polymers of the kind broadly described in the first paragraph of this specification and more particularly hereinafter can be prepared by contacting an anhydrous solution of a diazohydrocarbon, e.g., diazomethane, with a hydride of boron, e.g., diborane, and isolating (as by filtration, centrifuging, decanting, etc.) from the reaction mass a boron-containing polymer of the kind described hereinbefore. The average molecular weight of the solid polymers of this invention may range, for instance, from about 20,000 to 200,000 or more as determined by methods commonly used in determining the average molecular weight of high-density polyethylene.

Diazohydrocarbons that can be used in practicing the present invention are those embraced by the general formula (II) 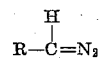

wherein R represents a hydrocarbon radical, including hydrocarbon radicals of the aliphatic (including cycloaliphatic), aromatic, aliphatic-substituted aromatic and aromatic-substituted aliphatic series. The exact nature of the linkage between the two nitrogen atoms and the carbon atom cannot be exactly written due to resonance between structures such as (III) 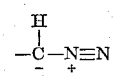

and (IV) 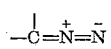

More specific examples of diazohydrocarbons that can be used in practicing the present invention are diazomethane, diazoethane, diazopropane, diazoisopropane, diazobutane, diazopentane, diazoisopentane, diazocyclohexylmethane, diazocyclohexylethane, diazophenylmethane, diazophenylethane, diazotolylmethane, diazotolylethane, diazobenzylmethane, diazobenzylethane, etc. To the best of our knowledge and belief any diazohydrocarbon that is available or that can be prepared can be employed in carrying our invention into effect.

Any suitable method can be used in preparing the diazohydrocarbons. For example, they may be produced by reacting an N-nitroso-N-hydrocarbon urea with aqueous alkali at approximately 0° C. in the presence of a suitable solvent for the diazo compound.

The hydrides of boron used in practicing the instant invention include, for example, diborane ($B_2H_6$), to decaborane ($B_{10}H_{14}$), inclusive, and the other known hydrides of boron embraced by the general formula $B_xH_y$. (In this connection see the abstract presented by McCarthy, Bragg and Norton in the October 13, 1950, issue of Science, vol. 112, p. 425.) Diborane, which is commercially available, is the preferred hydride of boron that is employed. It is a gaseous boron hydride which undergoes rapid decomposition at 100° C. and may be used as a starting material for preparing other boron hydrides.

It may here be mentioned that, prior to our invention, diborane and other hydrides of boron have been suggested for various uses in industry; for instance, in U.S. Patent No. 2,685,575—Heiligmann et al. it is suggested that diborane or other boron hydrides be used as a catalyst for the polymerization of ethylene and other polymerizable materials having doubly linked, non-aromatic carbon atoms, e.g., methyl methacrylate, vinylidene chloride, vinyl acetate and styrene. However, there is nowhere any teaching or suggestion in this patent of using diborane or other boron hydride as a reactant with diazomethane or other diazohydrocarbon to produce a new and useful polymer of the kind with which this invention is concerned and which contains at least about 1% but not more than about 20% by weight of boron combined in the polymer molecule.

The reaction between the boron hydride and diazohydrocarbon reactants is effected (as by contacting together) in an inert liquid medium at a temperature ranging, for example, from about −90° C. to about +30° C. The use of even lower temperatures than −90° C., e.g., −100° C., is not precluded, and higher temperatures than +30° C., e.g., +50° C., may be used in some cases, depending upon the particular reactants and solvents employed and the other specific conditions of reaction.

The reaction may be effected at atmospheric or superatmospheric pressure. It is carried out under anhydrous (substantially completely anhydrous) conditions. The liquid medium in which the reaction is effected is an anhydrous (substantially completely anhydrous), liquid medium which is inert during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. Illustrative examples of such liquid media (solvents or diluents) are dimethyl ether, diethyl ether, di-n-propyl ether, di-isopropyl ether, di-n-butyl ether, di-n-amyl ether, butyl methyl ether, dioxane, tetrahydrofuran, etc. Mixtures of ethers can be employed, e.g., mixtures of diethylene glycol dimethyl ether with diethyl ether and with other acyclic and cyclic ethers of the kind just mentioned.

The ratio of reactants is not critical and may be varied as desired or as conditions may require. In general, a sufficient amount of a boron hydride (e.g., diborane) should be employed so that not less than about 1% of boron becomes chemically combined in the polymer molecule. The maximum amount of boron that can be chemically combined in the polymer molecule is about 20% by weight of the polymer. The molar ratios of boron hydride to diazohydrocarbon usually are within the range of 1 mole of the former to from 5 to 80 moles of the latter.

The polymers of the present invention are believed to have the following general structure (and for purpose of illustration the structure of the boron-containing polymethylenes is shown):

(V)

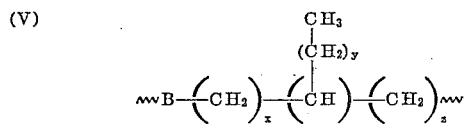

The boron-containing polymers of this invention, more particularly the boron-containing polymethylenes, are solid materials with a relatively high density (e.g., 0.96–0.97), show varying degrees of cross-linking, are relatively stiff, and are difficultly soluble in most common solvents. For example, polymethylene containing a little more than 1% of boron combined in the polymer molecule is insoluble in chlorobenzene, toluene, and in a hot eutectic mixture of diphenyl and diphenyl oxide.

The polymers of this invention are useful in plastic, film-forming, molding and other applications, for instance those wherein high-density polyethylenes generally are employed. In such applications they offer the additional advantages flowing from the fact that they contain boron combined in the polymer molecule. Consequently the polymers of this invention show improved flame-resisting properties (as compared with similar polymers in which boron is absent) without any material change in the other useful properties of the polymer. They are further characterized by their improved thermal stability as compared with other boron-containing polymers known in the art; and by their utility as, for example, neutron absorbers and scintillation counters.

In order that those skilled in the art may better understand how the present invention can be carried into effect, the following examples are given by way of illustration and not by way of limitation. All parts and percentages are by weight unless otherwise stated.

*Example 1*

Diazomethane, in diethyl ether solution, is freshly prepared from N-methyl-N-nitroso-p-toluenesulfonamide by the method described in Section I of the pamphlet of Aldrich Chemical Company, Inc., Milwaukee 10, Wisconsin [abstracted from Rec. trav. chim., 73, 229 (1954), and from the Ph.D. thesis of Dr. Th. J. DeBoer, Groningen, 1953]. The solution is dried over KOH pellets.

Diborane, in dry nitrogen gas as a carrier, is added to a reaction vessel containing a solution of diazomethane dissolved in a mixture of about two parts diethylene glycol dimethyl ether and one part diethyl ether. The solution is at room temperature (20°–30° C.). The ratio of diazomethane to diborane is 0.05 mole of the former to about 0.001 mole of the latter. A white precipitate forms almost immediately and is filtered off. Analysis shows that the dried material (polymethylene composition) has 1.4% of boron combined in the polymer molecule and has a hydrogen-to-carbon ratio of 2.02. The yield of dry polymer is about 60% of the theoretical based on the amount of diazomethane employed. The boron-containing polymethylene is not soluble in chlorobenzene or toluene, or in a hot eutectic mixture of diphenyl and diphenyl oxide, which facts would indicate that there is a substantial degree of cross-linking in the polymeric structure.

*Example 2*

Diborane (0.01 mole), in dry nitrogen gas as a carrier, is added to 0.13 mole of diazomethane dissolved in a mixture of about two parts diethylene glycol dimethyl ether and one part diethyl ether. This diazomethane solution is at room temperature (20°–30° C.). The yield of polymethylene material (M.P. 139° C.) containing more than 1% boron chemically combined in the polymer molecule, which is isolated and dried as in Example 1, is about 80% of the theoretical based on the amount of starting diazomethane employed.

It is not necessary that the boron hydride be used as such. It may be used in the form of a compound or complex which engenders a boron hydride. This is illustrated by the following example.

*Example 3*

Diborane, prepared as described in Example 1, is passed into tetrahydrofuran to form a complex therewith. The complex so prepared is analyzed and found to contain 2.4 millimoles $BH_3$ per milliliter of tetrahydrofuran. In this way, diborane (normally a gas) can be handled as a solution in tetrahydrofuran.

Diborane (0.001 mole) in tetrahydrofuran is added to 0.016 mole of diazomethane in diethyl ether at room temperature. A nearly quantitative yield of polymethylene material having boron combined in the polymer molecule precipitates and is filtered off. The dried material has a melting point of 137° C. It contains more than 1% boron chemically combined in the polymer molecule and has an average of less than 0.9 methyl groups per 100 methylene groups.

*Example 4*

A diazomethane solution as prepared in Example 1 is cooled to −82° C. Diborane, in nitrogen gas as a carrier, is added. A white product forms immediately. The reaction mass is allowed to come to room temperature. The precipitated polymer is filtered off and dried. Analysis shows that it contains 17.2% boron. Its melting point is over 300° C.

Instead of diazomethane in the foregoing examples, one can use an equivalent amount of any other diazohydrocarbon embraced by Formula II. Likewise, in place of diborane in the above examples, one can employ any other available hydride of boron or a compound or complex which engenders a boron hydride. As will be readily understood by those skilled in the art, variations in the temperature of reaction, solvent or diluent employed, and in other reaction conditions and equipment employed may be required when other starting reactants are used. The reaction may be carried out continuously, semi-continuously or by batch technique as desired or as conditions may require or may make advantageous.

*Example 5*

This example illustrates the use of a polymer of this invention, specifically the boron-containing polymethylene of Example 1, as a modifier of a synthetic resin, more particularly a melamine-formaldehyde resin.

| | Parts |
|---|---|
| Malamine-formaldehyde resin[1] | 600 |
| Polymethylene of Example 1 | 100 |
| Alpha-cellulose | 300 |
| Mold lubricant, specifically zinc stearate | 10 |

[1] This resin is a dry, heat-curable material obtained by reaction of melamine and formaldehyde in the ratio of 1 mole of the former to 2 moles of the latter.

The above ingredients are blended together in a mixing unit for 1¼ hours. The mixture is further worked on differential rolls having a clearance of 60 mils therebetween. The hot roll (fast roll) is at a temperature of about 150° C. at the beginning and about 140° C. at the end, while the temperature of the cold roll (slow roll) is 100° C. The modifying polymethylene blends in readily within a few minutes. The sheet forms on the cold roll, is transferred to the hot roll in 4 to 6 minutes, and is removed from the latter in 7½ minutes. The sheet shows good plasticity on the rolls and is removed in a single sheet. It is translucent, cream-colored, and very flexible and strong when cold. The sheet is broken and ground in an Abbé cutter through a ⅛" screen to form a molding compound for test purposes.

A molded article is produced by molding a sample of the molding compound for 5 minutes at 165° C. under a pressure of about 4500 pounds per square inch. A well-molded product having good strength characteristics and a good surface appearance is obtained.

We claim:

1. The method which comprises contacting an anhydrous solution of a diazohydrocarbon with a hydride of boron, said diazohydrocarbon being one represented by the general formula

wherein R represents a hydrocarbon radical and being employed in the ratio of from 5 to 80 mols thereof per mole of the said hydride of boron, and isolating from the reaction mass a boron-containing polymer wherein the boron is bonded directly to carbon and constitutes not less than 1% and not more than about 20% by weight of the polymer molecule.

2. The method which comprises contacting an anhydrous solution of diazomethane with a hydride of boron, the said reactants being employed in the ratio of from 5 to 80 moles of diazomethane per mole of the hydride of boron, and isolating from the reaction mass a boron-containing polymer wherein the boron is bonded directly to carbon and constitutes not less than 1% and not more than about 20% by weight of the polymer molecule.

3. A method as in claim 2 wherein the hydride of boron is diborane.

4. A method as in claim 2 wherein the anhydrous solution of diazomethane is maintained at a temperature within the range of from about −80° C. to about +30° C.

5. A process for the polymerization of diazomethane which comprises contacting under anhydrous conditions a solution of diazomethane in an inert solvent with a hydride of boron.

6. A solid polymer produced by the process defined in claim 1.

7. A solid polymer produced by the process defined in claim 5 wherein said hydride of boron is diborane.

8. A solid polymer produced by the process defined in claim 5 wherein said hydride of boron is tetraborane.

9. A solid polymer produced by the process defined in claim 5 wherein said hydride of boron is pentaborane.

10. A solid polymer produced by the process defined in claim 5 wherein said hydride of boron is decaborane.

References Cited by the Examiner

UNITED STATES PATENTS

| 2,558,559 | 6/1951 | Hurd et al. | 260—83.3 |
| 2,685,575 | 8/1954 | Heiligmann et al. | 260 |
| 2,864,842 | 12/1958 | Walter | 260—606.5 |
| 2,921,954 | 1/1960 | Ramsden | 260—462 |
| 2,962,489 | 11/1960 | Zeldin | 260—92.8 |
| 3,014,075 | 12/1961 | Saegebarth | 260—2 |
| 3,093,687 | 6/1963 | Clark et al. | 260—2 |
| 3,128,254 | 4/1964 | D'Alelio | 260—2 |

OTHER REFERENCES

Bawn et al.: Journal Polymer Science, vol. 34, pages 93–108, January 1959.

Feltzin et al.: Journal American Chemical Society, vol. 77, pages 206–210 (1955).

Korshak et al.: Chemical Abstracts, vol. 52, page 6266, (1958).

WILLIAM H. SHORT, *Primary Examiner.*

MILTON STERMAN, PHILLIP MANGAN, *Examiners.*

J. T. BROWN, H. D. ANDERSON, *Assistant Examiners.*